United States Patent [19]

Morgan

[11] Patent Number: 4,621,116

[45] Date of Patent: Nov. 4, 1986

[54] PROCESS FOR COPOLYMERIZATION OF TETRAFLUOROETHYLENE IN THE PRESENCE OF A DISPERSING AGENT COMPRISING A PERFLUOROALKOXYBENZENE SULFONIC ACID OR SALT

[75] Inventor: Richard A. Morgan, Vienna, W. Va.

[73] Assignee: E. I. Du Pont de Nemours and Company, Wilmington, Del.

[21] Appl. No.: 798,784

[22] Filed: Nov. 20, 1985

Related U.S. Application Data

[63] Continuation-in-part of Ser. No. 679,367, Dec. 7, 1984, abandoned.

[51] Int. Cl.[4] .................................... C08F 214/24
[52] U.S. Cl. ............................ 524/746; 524/545; 524/805; 526/209; 526/225; 526/247; 526/255
[58] Field of Search .............. 526/209, 225, 247, 254, 526/255; 524/746, 805, 545

[56] References Cited

U.S. PATENT DOCUMENTS

| | | | |
|---|---|---|---|
| 3,453,249 | 7/1969 | Szita et al. | 526/209 |
| 3,505,265 | 4/1970 | Teot et al. | 526/209 |
| 3,699,068 | 10/1972 | Flint et al. | 526/209 |
| 4,025,709 | 5/1977 | Blaise et al. | 526/225 |
| 4,224,455 | 9/1980 | Deutsch | 526/209 |
| 4,283,321 | 8/1981 | Charkrabarti et al. | 526/209 |
| 4,329,268 | 5/1982 | Chakrabarti et al. | 526/209 |
| 4,380,618 | 4/1983 | Khan | 526/206 |

*Primary Examiner*—Harry Wong, Jr.

[57] ABSTRACT

In the polymerization of tetrafluoroethylene with comonomers to make melt-processible copolymers, the presence of a selected salt of a perfluoroalkoxy-benzene sulfonic acid or salt of the acid enhances process performance.

7 Claims, No Drawings

PROCESS FOR COPOLYMERIZATION OF TETRAFLUOROETHYLENE IN THE PRESENCE OF A DISPERSING AGENT COMPRISING A PERFLUOROALKOXYBENZENE SULFONIC ACID OR SALT

CROSS REFERENCE TO RELATED APPLICATIONS

This application is a continuation-in-part of application Ser. No. 679,367, filed Dec. 7, 1984 now abandoned.

FIELD

This invention relates to an improvement in the copolymerization of tetrafluoroethylene and at least one ethylenically unsaturated comonomer, such as hexafluoropropylene (HFP) or perfluoropropyl vinyl ether (PPVE) or both to make melt-fabricable copolymers.

BACKGROUND

The copolymerization of tetrafluoroethylene with the comonomers specified above to make melt-fabricable, i.e., melt-processible, copolymers can be carried out in an aqueous reaction medium in the presence of a dispersing agent and an initiator. A commonly employed dispersing agent for this polymerization is ammonium perfluorooctanoate, $C_7F_{15}COONH_4$. Use of other dispersing agents with superior performance has long been a goal.

SUMMARY

In this invention, a new dispersing agent for use in the above-described copolymerization is employed which surprisingly provides higher comonomer incorporation at a given polymerization rate than the commonly used octanoate recited above, or conversely, provides a higher polymerization rate at a given comonomer content. The new dispersing agent is a perfluoroalkoxy benzene sulfonic acid or a salt thereof of the formula

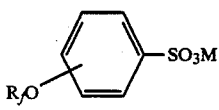

wherein $R_f$ is a linear or branched perfluorinated alkyl radical of 4 to 18 carbon atoms and preferably is perfluorinated alkyl of 7 to 12 carbon atoms, and M is hydrogen, ammonium or an alkali metal. Mixtures of such perfluoroalkoxybenzene sulfonic acids and salts may be employed if desired.

DESCRIPTION OF THE INVENTION

The copolymerization of tetrafluoroethylene and ethylenically unsaturated comonomers to produce melt-fabricable copolymers is well known in the art. Tetrafluoroethylene monomer and operable comonomers are typically reacted in an aqueous medium containing a polymerization initiator and a dispersing agent. Ordinarily, the gaseous monomers are introduced into the aqueous medium under pressure. Typical conditions include polymerization temperatures of 20°–120° C. preferably 70°–110° C.; and pressures of 100–800 psig (0.7–5.5 MPa), preferably 300–650 psig (2.1–4.5 MPa). The polymerization is ordinarily carried out in a stirred autoclave.

Representative fluorinated ethylenically unsaturated comonomers copolymerizable with tetrafluoroethylene are represented by the formulas:

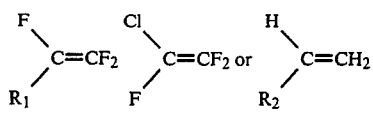

wherein $R_1$ is $-R_f$, $-R_f-X$, $-O-R_f$ or $-O-R_f-X$ in which $R_f$ is a perfluoroalkyl radical of 1–12 carbon atoms, $-R_f-$ is a perfluoroalkylene diradical of 1–12 carbon atoms in which the attaching valences are at each end of the chain, and X is H or Cl; and $R_2$ is $-R_f$ or $-R_f-X$.

Specific copolymerizable fluorinated ethylenically unsaturated comonomers include hexafluoropropylene, perfluoro(methyl vinyl ether), perfluoro(n-propyl vinyl ether), perfluoro(n-heptyl vinyl ether), 3,3,3-trifluoropropylene-1, 3,3,4,4,5,5,6,6-nonafluorohexene-1, 3-hydroperfluoro(propyl vinyl ether), or mixtures thereof, such as a mixture of hexafluoropropylene and perfluoro(propyl vinyl ether). Preferably the comonomers are selected from perfluoro(alkyl vinyl ethers) of the formula $R_f-O-CF=CF_2$; or hexafluoropropylene; or compounds of the formula $R_f-CH=CH_2$, wherein $-R_f$ is a perfluoroalkyl group of 1–12 carbon atoms.

Comonomer content can range from 0.5 mole percent up to about 20 mole percent, and more than one comonomer can be present.

The polymerization initiator may be any free radical-producing compound such as a peroxide, persulfate, azo compound and the like which has a half-life under the reaction conditions which is sufficient to maintain reaction and achieve the desired molecular weight. A promoter for the initiator decomposition, such as iron salts, may be employed. The amount of initiator employed depends on the temperature of polymerization, the nature of the initiator, the presence of a chain transfer agent or molecular weight modifier, the molecular weight of the polymer desired, and the rate of reaction desired. The chain-transfer agent or molecular weight modifier may be a 1–15 carbon saturated hydrocarbon or alcohol which may be partially fluorinated or chlorinated. Thus, the amount of initiator used is dictated by the molecular weight and polymerization rate desired by one skilled in the arts. The initiator is usually added prior to initiation of the reaction and during polymerization.

The amount of perfluoroalkyl benzene sulfonic acid or salt thereof which is added to the polymerization reactor will depend on the water and expected polymer weights. In general, a higher concentration of dispersing agent will be needed with higher expected polymer concentration in the final dispersion. In addition the level of dispersing agent will also depend on the degree of dispersion stability desired. Typically the polymer in the final product dispersion will amount to 15–45 wt % and the dispersing agent concentration will range from 0.02 to 0.5 weight percent of the final product dispersion.

One method of preparing the dispersing agent is to use an oligomer of hexafluoropropylene (HFP), react it with a phenol, and then sulfonate the product to give the desired structure. When formed in this manner, $R_f$ is branched and contains unsaturation. When $R_f$ is an HFP oligomer, the HFP trimer is preferred.

Structures for $R_f$ other than those derived from HFP oligomers are possible. $R_f$ may be linear, contain carbon-carbon double bonds, or contain carbon-oxygen-carbon bonds.

An aqueous medium is preferred, but also present in the water may be a solvent for the monomers and possibly for the initiator. This solvent may be 1,1,2 trichloro-1,2,2-trifluoroethane, 1,2-dichloro-1,1,2,2-tetrafluoroethane, trichlorofluoromethane, dichlorodifluoromethane, or perfluorocyclobutane.

By the term "melt-fabricable" is meant that the polymers have an apparent melt viscosity of less than $1 \times 10^7$ poise at 372° C. Melt viscosity of the tetrafluoroethylene copolymers is measured according to ASTM D-1238-52T modified by (1) using a cylinder, orifice and piston tip made of a corrosion-resistant alloy, Haynes Stellite 19, (2) charging a 5.0 g sample to the 9.53 mm ID cylinder which is maintained at 372°±1° C., (3) five minutes after charging, extruding the sample through a 2.10 mm diameter, 8.00 mm long square-edged orifice under a load (piston plus weight) of 5000 g (this corresponds to a shear stress of 0.457 kg/cm² (44.8 kPa). The melt viscosity in poise is calculated as 53170 divided by the observed extrusion rate in grams per minute.

Ordinarily the amount of comonomer units present in the copolymer will be an amount sufficient to afford satisfactory mechanical properties. For hexafluoropropylene that will be between 4.0 and 12.0 mole % and for perfluoropropyl vinyl ether) that will be between 0.4 to 10 mole %. In a TFE/HFP/PPVE terpolymer, the HFP level may be from 0.2 to 12 mole percent and the PPVE level may be from 0.3 to 10 mole percent.

Polymerization is ordinarily conducted until the solids level (i.e., polymer content) of the aqueous mixture is between about 15 and 40 percent by weight of the mixture.

Higher comonomer incorporation in a TFE copolymer is advantageous to enhance certain resin physical properties. Higher polymerization rates are desirable to maximize production rates. Higher levels of comonomer incorporation tend to reduce polymerization rate. The dispersing agent of this invention may be used to achieve either higher comonomer content or higher polymerization rate. In addition, the polymerization reactor is found to be very easy to clean after using the dispersing agent described herein.

In the Examples, comonomer content is measured as follows:

The HFP content in the TFE/HFP copolymers described herein is determined by measurement of the ratio of the infrared absorbance at 10.18 micrometers to the absorbance at 4.25 micrometers. This ratio is referred to as the HFP index or HFPI. Reference films of known HFP content, as determined by F19 NMR, are also run to calibrate the HFPI. The mole percent HFP present is equal to 2.1 times the HFPI. Compression-molded films approximately 0.10–0.11 mm thick are scanned under a nitrogen atmosphere.

The PPVE content in the TFE/PPVE copolymers described herein is also determined by infrared spectroscopy. The ratio of absorbance at 10.07 micrometers to that at 4.25 micrometers is determined under a nitrogen atmosphere using films approximately 0.05 mm thick. The films are compression molded at 350° C., then immediately quenched in ice water. This absorbance ratio is then used to determine percent PPVE by means of a calibration curve established with reference films of known PPVE content. F19 NMR is used as the primary standard for calibrating the reference films.

For TFE/HFP/PPVE terpolymers, some of the absorption bands overlap, and corrections must be made in the analysis, as described in U.S. Pat. No. 4,029,868.

The Examples hereinbelow describe the invention in greater detail.

EXAMPLE 1 AND COMPARISON A

A cylindrical, horizontally disposed, water-jacketed, stirred, stainless steel reactor having a length to diameter ratio of about 1.5 and a water capacity of 80 parts was charged with 55 parts of water and 0.044 parts of dispersing agent in Example and 0.037 parts dispersing agent in Comparison A. The mixture was heated to 65° C. and then the reactor was evacuated and purged with tetrafluoroethylene (TFE). The reactor temperature was then raised to 95° C. and agitation begun at 34 rpm. The reactor was pressured to the desired level (370 psig or 2.6 MPa) with comonomer (HFP) and then to 600 psig (4.1 MPa) with TFE. A freshly prepared solution (1.32 parts) of 0.015M ammonium persulfate initiator was added to the reactor at the rate of 0.11 parts/minute to initiate polymerization and then a 0.034M potassium persulfate initiator solution was added at the rate of 0.022 parts/minute for the remainder of the batch. After polymerization started, as indicated by a 0.07 MPa (10 psi) pressure drop, additional TFE was added to the reactor at the rate of 0.115 parts/minute until completion of the polymerization (final solids levels of 21–24 percent by weight were obtained). The agitator speed was varied as required to maintain a constant 600 psig (4.1 MPa) pressure level. The reactor temperature was maintained at 95° C.

At the end of the reaction, the TFE feed and the agitator were turned off. Cooling water was circulated through the reactor jacket and the reactor was vented. The addition of initiator solution was stopped, the reactor was purged of any residual monomer with nitrogen, and the aqueous copolymer dispersion was discharged. The dispersion was coagulated by vigorous stirring to obtain a melt-fabricable TFE/HFP copolymer fluff which was dried before analyses were carried out.

The example and comparison are summarized in Table I. The higher HFP content obtained using the sodium salt of perfluorononoxybenzene sulfonic acid of this invention relative to the use of the commonly used ammonium perfluorooctanoate (designated C-8) is demonstrated in the Table.

EXAMPLE 2 AND COMPARISONS B AND C

The procedure described for Example 1 and Comparison A was followed, except that the dispersing agent concentration was essentially doubled, and during the reaction the potassium persulfate initiator solution added was of 0.037M concentration instead of 0.034M. The Example and Comparisons are summarized in Table I.

Comparison C shows the use of a dispersing agent of similar structure to that used in Examples 1 and 2 except that the perfluoroalkoxy chain is based on an HFP dimer where the backbone chain is 3 carbons in length and contains branches totaling 3 carbons. This dispersing agent produced a polymer with a lower HFP content than Examples 1 and 2. Thus the perfluoroalkoxy chain should have a minimum of 4 atoms in its backbone.

$7.0 \times 10^3$ poise and it contained 1.10 mole percent PPVE.

TABLE I

| Example or Comparison | Dispersing Agent Employed | Initiator Concentration | Dispersing Agent Conc. wt. %[1] | HFP Partial Pressure (MPa) | Agitator Speed (rpm) | Mole % HFP in Polymer |
|---|---|---|---|---|---|---|
| Comparison A | Ammonium salt of perfluorooctanoic acid | 0.034 M | 0.049 | 2.6 | 34 | 7.36 |
| Example 1 | Sodium salt of perfluorononoxybenzene sulfonic acid | 0.034 M | 0.057 | 2.6 | 32 | 7.79 |
| Comparison B | Ammonium salt of perfluorooctanoic acid | 0.037 M | 0.103 | 2.6 | 33 | 7.04 |
| Example 2 | Sodium salt of perfluorononoxybenzene sulfonic acid | 0.037 M | 0.102 | 2.6 | 32 | 8.25 |
| Comparison C | Sodium salt of perfluorohexoxybenzene sulfonic acid | 0.037 M | 0.103 | 2.6 | 40 | 6.55 |

[1] Based on weight of product dispersion

EXAMPLE 3 AND COMPARISON

The same reactor described in the previous Examples and Comparisons was charged with 48 parts of demineralized water, and 0.066 parts of sodium perfluorononoxybenzene sulfonate. The reactor was closed, evacuated, purged three times with tetrafluoroethylene (TFE) and evacuated again, all at about 20° C. reactor temperature. Ethane was introduced into the reactor until a 13.5 kPa rise in pressure occurred. Then 0.56 parts of perfluoropropyl vinyl ether (PPVE) and 1.19 parts of FREON ® 113 (CCl$_2$FCClF$_2$) were drawn into the reactor. The agitator was turned on and the contents were heated to 80° C. The reactor was pressurized to 2.2 MPa (300 psig) with TFE and simultaneously a solution (1.19 parts) of 0.011M ammonium persulfate (APS) initiator was pumped into the reactor. After polymerization kickoff had occurred (0.07 MPa or 10 psi drop in pressure), additional PPVE and a 0.005M APS solution were pumped to the reactor for the remainder of the polymerization at the rates of 0.20 parts per hour and 1.32 parts per hour, respectively. The agitator speed was varied to control the reaction rate so that 0.1 parts per minute of additional TFE was needed to maintain a constant 2.2 MPa (300 psig) pressure. After 15.4 parts of TFE had been added (measured after kickoff), the TFE and PPVE feeds were stopped and the agitator was turned off. The initiator solution continued to be pumped until the reactor was vented of unreacted monomer. The reactor was purged of any residual monomer with nitrogen, and the aqueous copolymer dispersion was discharged. The dispersion was coagulated and dried as in Example 1 before analysis. Analysis showed it had a melt viscosity at 372° C. of The identical procedure to the above was followed except that the sodium perfluorononoxy benzene sulfonate was replaced by the same weight of ammonium perfluorooctanoate. In this case, the melt viscosity was $1.3 \times 10^4$ poise and the PPVE content of the polymer was found to be only 0.93 mole percent.

I claim:

1. In the polymerization process to obtain an aqueous dispersion of a melt-processible copolymer of tetrafluoroethylene and at least one ethylenically unsaturated comonomer present in the copolymer in an amount of up to 20 mole percent, wherein the copolymer comprises 15-45 wt. % of the aqueous dispersion, in the presence of an initiator and a dispersing agent, the process improvement which comprises employing as the dispersing agent a perfluoroalkoxybenzene sulfonic acid or a salt thereof of the formula

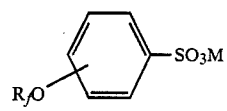

wherein R$_f$ is a linear or branched perfluorinated alkyl radical of from 4 to 18 carbon atoms, and M is hydrogen, ammonium or an alkali metal, said dispersing agent being present in an amount between 0.02 and 0.5% based on weight of final copolymer dispersion obtained.

2. The process of claim 1 wherein M is sodium.
3. The process of claim 1 or 2 wherein R$_f$ is a perfluorinated alkyl radical of from 7 to 12 carbon atoms.
4. The process of claim 1 or 2 wherein R$_f$ is a perfluorinated nonyl radical.

5. The process of claim 1 wherein the perfluoroalkoxybenzene sulfonic acid and/or salt is present in an amount between 0.05 and 0.2% based on final product dispersion.

6. The process of claim 1 wherein the comonomer is selected from hexafluoropropylene, or perfluoropropyl vinyl ether, or is a combination of both.

7. The process of claim 1 wherein a non-water-soluble solvent is also present during polymerization.

* * * * *